UNITED STATES PATENT OFFICE.

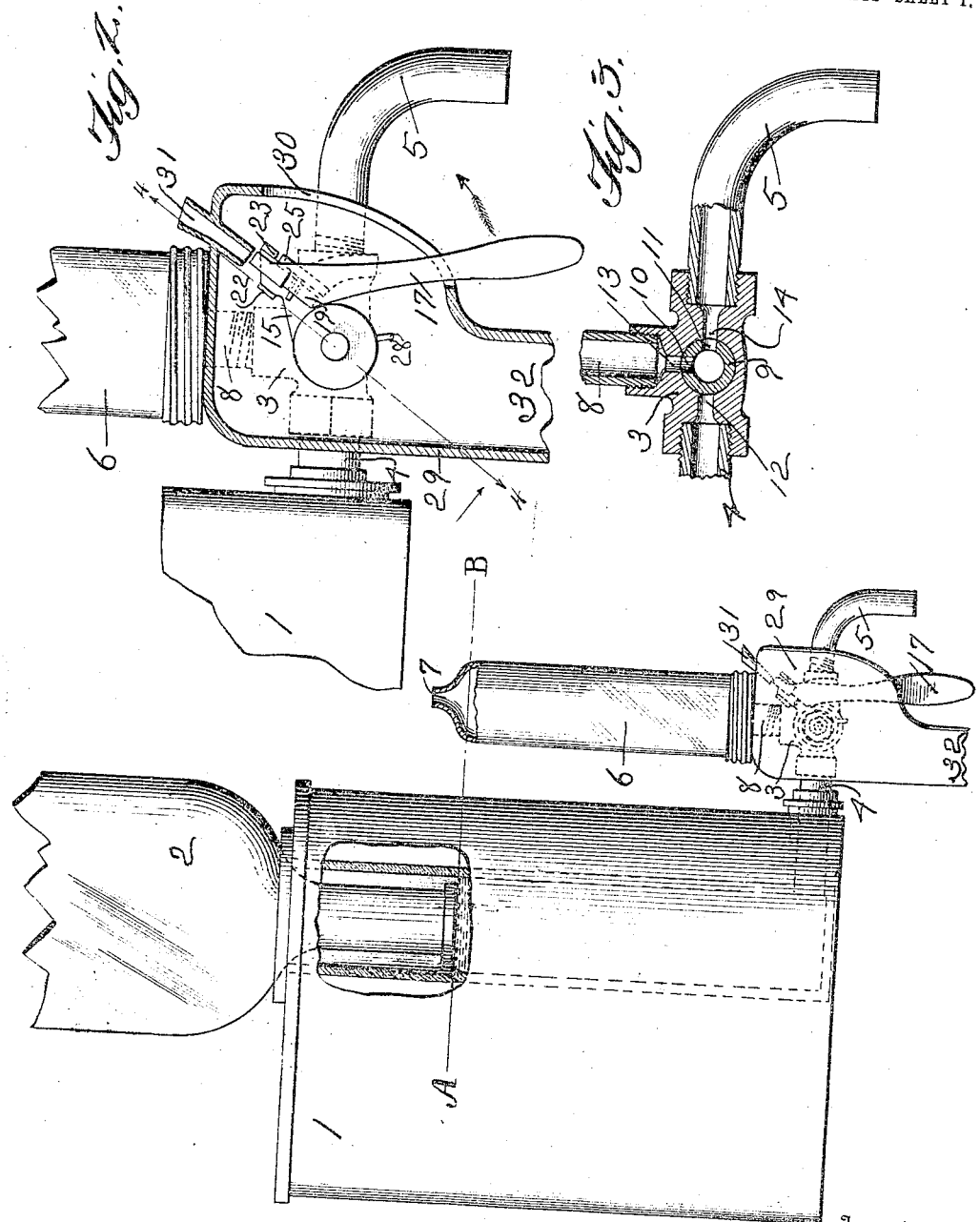

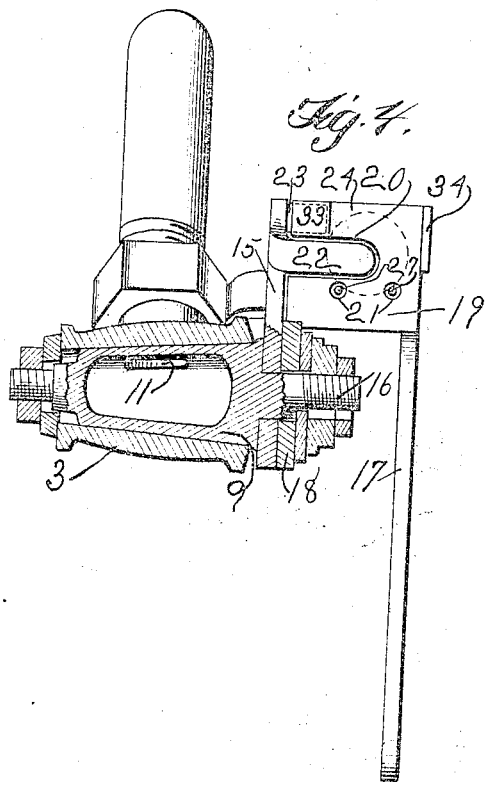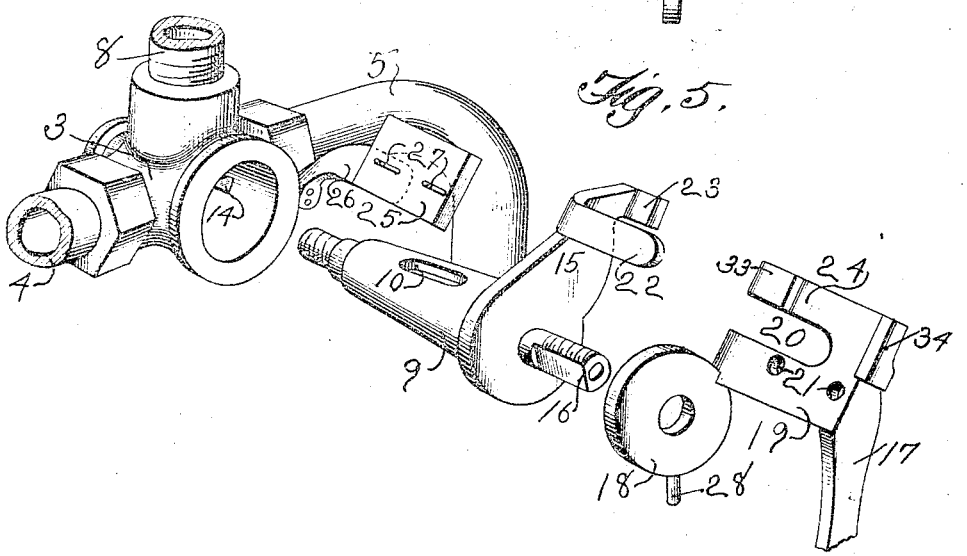

HENRY G. CORDLEY, OF GLEN RIDGE, NEW JERSEY, AND EDWARD KLEINSCHMIDT, OF NEW YORK, N. Y., ASSIGNORS TO HENRY G. CORDLEY, OF GLEN RIDGE, NEW JERSEY.

LIQUID MEASURING AND VENDING DEVICE.

968,743.  Specification of Letters Patent.  Patented Aug. 30, 1910.

Application filed October 28, 1907. Serial No. 399,503.

*To all whom it may concern:*

Be it known that we, HENRY G. CORDLEY, a citizen of the United States, residing at Glen Ridge, in the county of Essex, State of New Jersey, and EDWARD KLEINSCHMIDT, a citizen of the United States, residing in the borough of Brooklyn, New York city, New York, have invented certain new and useful Improvements in Liquid Measuring and Vending Devices, of which the following is a description, reference being had to the accompanying drawings, forming a part hereof.

Our invention relates to an improved liquid measuring and vending device adapted to deliver measured quantities of liquid in exchange for a coin; and it consists in the measuring and vending device described in the following specification, illustrated in the accompanying drawings, and particularly defined in the clauses of the concluding claim.

In the accompanying drawings; Figure 1 is a view of our device in elevation and attached to a suitable water cooler, a portion of the water cooler being broken away to show the interior construction thereof and the means whereby a constant level of liquid is maintained therein, Fig. 2 is an enlarged view showing our device more in detail, Fig. 3 is a sectional view through a rotary valve forming a part of our device, Fig. 4 is a section taken upon the line 4—4 of Fig. 2, certain elements being omitted for the sake of clearness of illustration, the conduit 4 and the parts of the valve casing adjacent thereto being also shown, and, Fig. 5 is a perspective view of the valve and operating means therefor, the parts being shown separated.

Our improved liquid measuring and vending device is designed for use in connection with and for measuring and vending water or other beverage from a cooler supplied from an inverted bottle, and in which cooler a constant level of liquid is maintained, and in Fig. 1 the reference character 1 indicates the external casing of such a cooler and 2 an inverted bottle containing a supply of liquid, the level of the liquid being maintained at about the level indicated by the line A, B, in a manner well understood.

3 is a valve casing having a supply conduit 4 leading from a source of supply, and a discharge conduit terminating in a spout 5.

6 is a measuring vessel made preferably of glass and having an opening at its upper end as at 7 whereby said measuring vessel will always be in open communication with the surrounding atmosphere; and this measuring vessel is connected with the valve casing 3 by the conduit 8 which conduit also preferably serves as a support for the measuring glass.

9 is a rotary valve located within the valve casing 3, and 10 and 11 are ports in communication with one another by means of a passage extending through the rotary valve and which are adapted to register with the ports 12 and 13 thereby establishing communication between the supply conduit 4 and the conduit 8 leading to the measuring vessel 6; or, as illustrated in Fig. 3, to register with ports 13 and 14, thereby establishing communication between the measuring vessel and the discharge spout 5. The valve 9 is normally in the position shown in Fig. 3, so that the measuring vessel 6 is normally in communication with the discharge spout. Said valve is, however, in the operation of the device, rotated by mechanism hereinafter to be described so as to establish communication between the source of supply and the measuring vessel.

15 is an arm rigidly secured to the valve 9 and by means of which said valve may be rotated, and 16 is a spindle projecting from the valve.

17 is an operating lever for rotating the valve 9. This lever is provided with a bearing 18 by means of which it is supported by and normally free to move about the spindle 16 as an axis and without rotating the valve 9, but the said lever and valve may be connected together in the manner hereinafter described so that movement imparted to the lever will rotate the valve through the arm 15. The operating lever 17 is provided with a shelf-like portion 19 adjacent the bearing 18 for receiving and supporting a coin which shelf portion is provided with a slot 20 and with one or more holes 21, 21.

The arm 15 is provided with a lug 22 which is bent over so as to extend parallel with and at a short distance from the shelf portion 19 of the lever 17, and said lug is so designed and positioned upon the arm that it may pass through the slot 20 of the shelf portion 19 when the lever 17 is operated, as will be understood from Fig. 4 of the drawings. The arm 15 is also provided with a second lug 23 similar to but shorter than the lug 22, which lug is adapted to be engaged by the upper portion 24 of the shelf portion 19, whereby the arm may be moved to the right (Figs. 2 and 5) by the lever 17.

25 is a stop supported from the valve casing 3 by means of a bracket 26 and against which the shelf portion 19 rests, as will be understood from Figs. 2 and 5.

27, 27 are pins carried by the stop 25 and projecting through the holes 21, 21, when the parts are assembled.

28 is a pin carried by the bearing 18 and which engages with the stop 25 to limit the movement of the operating lever when the valve 9 is operated.

Our device is intended to be used as a coin controlled liquid vending device as above stated; to which end we surround the operating mechanism for the valve with a casing 29 having a slot 30 in which the operating lever 17 works, a chute 31 through which a coin may be supplied, and a passage way 32 shown broken away but designed to lead to a suitable box for receiving the coins.

33 and 34 are stops placed upon the shelf 19 to guide and maintain the coin in proper position.

Our device operates as follows: A coin upon being placed in the chute 31 slides down between the stops 33 and 34 on to the shelf portion 19 and beneath the lug 22 until it comes to rest against the pins 27 as indicated in dotted lines in Fig. 4. The operating lever 17 is now moved in the direction of the arrow, Fig. 2, whereupon the coin will be brought into engagement with the lug 22 of the arm 15, the pins 27 still maintaining the coin in proper position. Further movement of the operating lever will now rotate the valve 9 into position such that the ports 10 and 11 will register with the ports 12 and 13, the coin meanwhile having been carried beyond the pins 27. The operating lever having now reached its extreme position, liquid will flow through the conduits 4 and 8 into the measuring glass 6 until the level therein corresponds with the level of the liquid in the cooler 1. The operating lever 17 is now moved in the reverse direction, whereupon the coin will be released and will fall from the shelf 19 and pass through the passage way 32 into a suitable box. During the return movement of the lever 17 the upper portion 24 of the shelf portion 19 engages with the lug 23 of the arm 15 to thereby rotate the valve 9 back into its original position as indicated in Fig. 3. The liquid in the measuring vessel 6 is now free to flow therefrom through the conduit 8 and spout 5 into a suitable receptacle.

Having thus described our invention and explained the mode of operation thereof, we claim and desire to secure by Letters Patent:—

1. In a water cooler, a cooling chamber; means for maintaining a constant level of water in said cooling chamber; a measuring vessel the upper end of which extends above the level of water in said cooling chamber and which measuring vessel is in open communication with the atmosphere; a valve casing having supply and discharge passages, and having also a third passage through which water may flow to said measuring vessel; a conduit connecting said cooling chamber with the supply passage of said valve casing; a rotary valve within said casing and having a passage which passage may establish communication between said third passage and said supply passage or between said third passage and said discharge passage, according to the position into which said valve may be moved, to thereby control the flow of water through the passages in said valve casing; an arm secured to said rotary valve and through which said valve may be rotated; a spindle projecting from said valve; a lever supported by and free to move upon said spindle as an axis; a stop carried by said valve casing and serving to limit the movement of said lever in one direction; means whereby said lever and arm may be connected together to thereby rotate said arm and valve in one direction; and means carried by said arm and engaged by said lever for rotating said arm and valve in a reverse direction.

2. In a water cooler, a cooling chamber; means for maintaining a constant level of water in said cooling chamber; a valve casing having supply and discharge passages, and having also a third passage; a conduit communicating with said third passage and extending upwardly therefrom; a measuring vessel independent of said valve casing and supported by said conduit, the upper end of which measuring vessel extends above the level of water in said cooling chamber and which measuring vessel is in open communication with the atmosphere; a conduit connecting said cooling chamber with the supply passage of said valve casing; a rotary valve within said casing and having a passage which passage may establish communication between said third passage and said supply passage or between said third passage and said discharge passage, according to the position into which said valve may be moved, to thereby control the flow of water through the passages in said valve casing; an arm secured to said rotary valve and through which said valve may be rotated; a spindle projecting from said valve; a lever supported by and free to move upon said spindle as an axis; a stop for limiting the movement of said lever in one direction; means whereby said lever and arm may be connected together to thereby rotate said valve in one direction; and means carried by said arm and engaged by said lever to thereby rotate said valve in a reverse direction.

3. In a water cooler, a cooling chamber; means for maintaining a constant level of water in said cooling chamber; a measuring vessel the upper end of which extends above the level of water in said cooling chamber and which measuring vessel is in open communication with the atmosphere; a valve casing having a normally closed supply passage and a normally open discharge passage, and having also a third passage through which water may flow to said measuring vessel; a conduit connecting said cooling chamber with the supply passage of said valve casing; a rotary valve within said casing and having a passage which passage may establish communication between said third passage and said supply passage or between said third passage and said discharge passage, according to the position into which said valve may be moved, to thereby control the flow of water through the passages in said valve casing; an arm secured to said rotary valve and through which said valve may be rotated; a spindle projecting from said valve; a lever supported by and free to move upon said spindle as an axis; a stop for limiting the movement of said lever in one direction; means whereby said lever and arm may be connected together to thereby rotate said valve in one direction to close said discharge passage and to open said supply passage; and means carried by said arm and engaged by said lever to thereby rotate said valve in a reverse direction to close said supply passage and open said discharge passage.

4. In a water cooler, a cooling chamber; means for maintaining a constant level of water in said cooling chamber; a measuring vessel the upper end of which extends above the level of water in said cooling chamber and which measuring vessel is in open communication with the atmosphere; a valve casing having a normally closed supply passage and a normally open discharge passage, and having also a third passage through which water may flow to said measuring vessel; a conduit connecting said cooling chamber with the supply passage of said valve casing; a rotary valve within said casing and having a passage which passage may establish communication between said third passage and said supply passage or between said third passage and said discharge passage, according to the position into which said valve may be moved, to thereby control the flow of water through the passages in said valve casing; an arm secured to said rotary valve and through which said valve may be rotated; an operating lever adapted to rotate said valve; a stop for limiting the movement of said lever in one direction; means whereby said lever and arm may be connected together to thereby rotate said valve in one direction to close said discharge passage and to open said supply passage; and means carried by said arm and engaged by said lever to thereby rotate said valve in a reverse direction to close said supply passage and open said discharge passage.

5. In a water cooler, a cooling chamber; means for maintaining a constant level of water in said cooling chamber; a measuring vessel the upper end of which extends above the level of water in said cooling chamber and which measuring vessel is in open communication with the atmosphere; a valve casing having a normally closed supply passage and a normally open discharge passage, and having also a third passage through which water may flow to said measuring vessel; a conduit connecting said cooling chamber with the supply passage of said valve casing; a rotary valve within said casing and having a passage which passage may establish communication between said third passage and said supply passage or between said third passage and said discharge passage, according to the position into which said valve may be moved, to thereby control the flow of water through the passages in said valve casing; an arm secured to said rotary valve and through which said valve may be rotated; an operating lever adapted to move about the axis of said rotary valve and through which said valve may be rotated; a stop for limiting the movement of said lever in one direction; means whereby said lever and arm may be connected together to thereby rotate said valve in one direction to close said discharge passage and to open said supply passage; and means carried by said arm and engaged by said lever to thereby rotate said valve in a reverse direction to close said supply passage and open said discharge passage.

6. In a water cooler, a cooling chamber; means for maintaining a constant level of water in said cooling chamber; a valve casing having supply and discharge passages, and having also a third passage; a conduit communicating with said third passage and extending upwardly therefrom; a measuring vessel independent of said valve casing and supported by said conduit, the upper end of which measuring vessel extends above the level of water in said cooling chamber and which measuring vessel is in open communication with the atmosphere; a conduit connecting said cooling chamber with the supply passage of said valve casing; a rotary valve within said casing and having a passage which passage may establish communication between said third passage and said supply passage or between said third passage and said discharge passage, according to the position into which said valve may be moved, to thereby control the flow of water through the passages in said valve casing; an arm secured to said rotary valve and through which said valve may be rotated; an operating lever adapted to rotate said valve; a stop for limiting the movement of said lever in one direction; means whereby said lever and arm may be connected together to thereby rotate said valve in one direction; and means carried by said arm and engaged by said lever to thereby rotate said valve in a reverse direction.

7. In a water cooler, a cooling chamber; means for maintaining a constant level of water in said cooling chamber; a valve casing having supply and discharge passages, and having also a third passage; a conduit communicating with said third passage and extending upwardly therefrom; a measuring vessel independent of said valve casing and supported by said conduit, the upper end of which measuring vessel extends above the level of water in said cooling chamber and which measuring vessel is in open communication with the atmosphere; a conduit connecting said cooling chamber with the supply passage of said valve casing; a rotary valve within said casing and having a passage which passage may establish communication between said third passage and said supply passage or between said third passage and said discharge passage, according to the position into which said valve may be moved, to thereby control the flow of water through the passages in said valve casing; an arm secured to said rotary valve and through which said valve may be rotated; an operating lever adapted to move about the axis of said rotary valve and through which said valve may be operated; a stop for limiting the movement of said lever in one direction; means whereby said lever and arm may be connected together to thereby rotate said valve in one direction; and means carried by said arm and engaged by said lever to thereby rotate said valve in a reverse direction.

8. In a water cooler, a cooling chamber; means for maintaining a constant level of water in said cooling chamber; a measuring vessel the upper end of which extends above the level of water in said cooling chamber and which measuring vessel is in open communication with the atmosphere; a valve casing having supply and discharge passages, and having also a third passage through which water may flow to said measuring vessel; a conduit connecting said cooling chamber with the supply passage of said valve casing; a rotary valve within said casing and having a passage which passage may establish communication between said third passage and said supply passage or between said third passage and said discharge passage, according to the position into which said valve may be moved, to thereby control the flow of water through the passages in said valve casing; an arm secured to said rotary valve and through which said valve may be rotated; an operating lever adapted to rotate said valve; a stop carried by said valve casing and serving to limit the movement of said lever in one direction; means whereby said lever and arm may be connected together to thereby rotate said arm and valve in one direction; and means carried by said arm and engaged by said lever for rotating said arm and valve in a reverse direction.

This specification signed and witnessed this 23rd day of October A. D. 1907.

HENRY G. CORDLEY.
EDWARD KLEINSCHMIDT.

In the presence of—
  J. B. KORNDORFER,
  P. LEAVELL.